Patented May 12, 1936

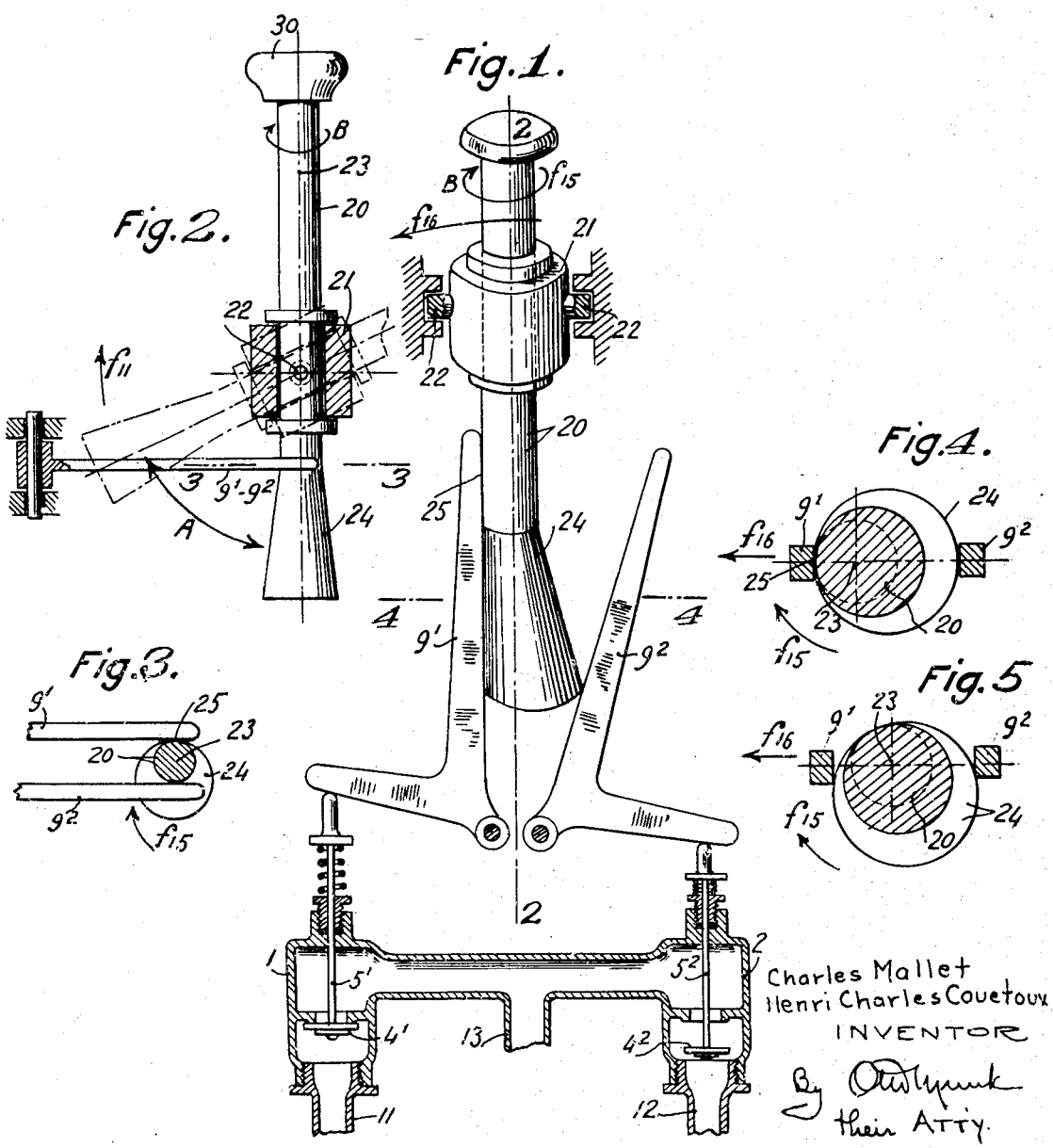

UNITED STATES PATENT OFFICE 2,040,663

INSTALLATION FOR MIXING TWO FLUIDS

Charles Mallet and Henri Charles Couetoux, Paris, France, assignors to Etablissements Jacob Delafon Compagnie Ceramique de Pouilly-sur-Saone et Belvoye, Paris, France, a company of France Application September 25, 1934, Serial No. 745,385 In France October 11, 1933

1 Claim. (Cl. 277—18)

The object of the present invention is to provide a simple and efficient installation for mixing two fluids.

Another object is to reduce in such an installation the number of controlling members and, consequently, make easier the maintenance of the installation.

A further object is readily to regulate the output of the two mixed fluids and also the proportion of the two fluids in the mixture.

Yet another object is to effect these regulating operations by means of a single member which may, for example, be operated with one hand.

These objects are attained by a construction presenting the characteristics hereinafter described and included in the appended claim.

A preferred form of the invention is illustratively exemplified with accompanying drawing in which Fig. 1 is a perspective view partly in section of this preferred form; Fig. 2 is a partial longitudinal section on line 2—2 of Fig. 1 showing different positions of the regulating member; Fig. 3 is a partial transverse section on the line 3—3 of Fig. 2; Fig. 4 is a transverse section on line 4—4 of Fig. 1 and Fig. 5 is a view similar to Fig. 4 with the regulating member in another position.

In the embodiment of the invention, which is illustrated in Figures 1 to 5, the single regulating member consists of a lever 20, which is rotatable without sliding in a bearing 21, this bearing turning about an axis 22 perpendicular to the axis of rotation 23 of the lever 20. This lever 20 is integral or virtually integral with a cam 24 gripped between two control levers $9^1$ and $9^2$, which actuate the cocks 1 and 2. This cam is shaped like an eccentric truncated cone, one of the generating lines 25 of which is parallel to the axis of rotation 23.

When the lever 20 is rotated about its axis 23, in the direction of the arrow $f^{15}$, for example, (movement B), one or other of the following operations is performed:—

(a) If the bearing 22 is occupying the position illustrated in full lines in Figure 2, that is to say, if the section of contact of the cam with the levers $9^1$ and $9^2$ is the section which is concentric with the axis 23, the cocks 1 and 2 remain closed;

(b) If the bearing 22 is no longer occupying the position indicated in full lines in Figure 2 but a different position (movement A), for instance the position indicated in dotted lines in the same figure, the cock 1 passes from the position of complete closure to an open position, while the cock 2 passes from an open position to a completely closed position, the amplitude of the opening movement depending upon the position taken up by the lever 20 (in the movement A).

On the other hand, when the lever 20 is displaced in the direction $f_{11}$ in Figure 2, (movement A) by rotating its bearing 21 about its axis 22, one or the other of the following operations is performed:—

(a) If the cam 24 is occupying the position of Figures 1 to 4, that is to say, if the generating line 25 parallel to the axis 23 is in engagement with the lever $9_1$, the corresponding cock 1 remains closed, while the other cock 2 opens during the displacement of the cam 24 in the direction $f_{11}$ (movement A);

(b) If the cam 24 is occupying a position other than that of Figure 4, for instance that of Figure 5, the two cocks 1 and 2 open or close simultaneously, the opening strokes of the two cocks being variably proportioned to one another according to the position of the cam 24 during the movement B.

What we claim is:—

In an installation for mixing two fluids, a first obturator controlling the outflow of a first fluid, a second obturator controlling the outflow of the second fluid, a control lever mounted to rotate about its axis and about a perpendicular axis, a cam carried directly by this lever and means engaging said cam for controlling the two obturators.

CHARLES MALLET.
HENRI CHARLES COUETOUX.